United States Patent [19]

Hughes et al.

[11] Patent Number: 5,930,780
[45] Date of Patent: *Jul. 27, 1999

[54] DISTRIBUTED GENETIC PROGRAMMING

[75] Inventors: Jeremy Peter James Hughes, Southampton; Bahadar Singh Ruprai, Birmingham, both of United Kingdom

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,957

[22] Filed: Feb. 27, 1997

[30] Foreign Application Priority Data

Aug. 22, 1996 [GB] United Kingdom .................... 9617632

[51] Int. Cl.⁶ ................................................ G06F 15/18
[52] U.S. Cl. ............................................... 706/13; 706/10
[58] Field of Search ............................... 395/13; 706/13, 706/10

[56] References Cited

U.S. PATENT DOCUMENTS

| 5,495,419 | 2/1996 | Rostoker et al. | 364/468.28 |
| 5,708,774 | 1/1998 | Boden | 395/183.14 |

FOREIGN PATENT DOCUMENTS

| 0696000 | 2/1996 | European Pat. Off. ........ G06F 15/18 |

OTHER PUBLICATIONS

"Genetic programming: on the progamming of computers by means by natural selection" by John Koza, MIT Press, 1992 (ISBN 0–262–11170–5) S.3.3.2 pp.54–59; S.7.2 pp. 147–162.

"A Summary of Research on Parallel Genetic Algorithms" by E Cantu–Paz, IlliGAL Report No. 95007, Jul. 1995, from the Genetic Algorithms Laboratory at the University of Illinois, USA.

"Genetic Programming of Music", by Jeffrey Putnam, New Mexico Institute of Mining and Technology –Aug. 30, 1994.

"A Life in Silicon", by Joe Flower, in the New Scientist, Jun. 15, 1996, pp.33–36.

Append by Danno Ferrin on Fri. Mar. 15, 1996 to comp.lang.java and comp.ai.genetic newsgroups.

P. Prinetto et al. "GATTO: An Intelligent Tool for Automatic Test Pattern Generation for Digital Circuits," 1994 Int'l Conference on Tools with Artificial Intelligence, pp. 411–417, 1994.

B. B. P. Rao et al. "Extended Distributed Genetic Algorithm for Channel Routing," 1993 Symposium on Parallel and Distributed Processing (5th), pp. 726–733, 1993.

J. B. Putnam. "Genetic Programming of Music," New Mexico Institute of Mining and Technology, Aug. 30, 1994.

F. Corno et al. "A Portable ATPG tool for Parallel and Distributed Systems," 1995 VLSI Symposium, pp. 29–34, 1995.

Primary Examiner—Tariq R. Hafiz
Assistant Examiner—Jason W. Rhodes
Attorney, Agent, or Firm—Gregory M. Doudnikoff

[57] ABSTRACT

A method is described for performing distributed genetic programming using a server and a plurality of client machines which are connected together by a computer network such as the Internet. The genetic programming seeks to optimise a population of individuals against one or more predetermined fitness criteria. The method includes downloading instructions for performing a fitness evaluation on an individual from the server to the client machines; distributing individuals from the population of individuals from the server across the plurality of client machines; and evaluating the fitness of the distributed individuals at the client machines by using the downloaded instructions. Those individuals which have the best fitness are preferentially selected for breeding to produce the next generation of individuals. This breeding is preferably also performed on the client machines.

13 Claims, 3 Drawing Sheets

DISTRIBUTED GENETIC PROGRAMMING

The present invention relates to genetic programming or a genetic algorithm implemented in a distributed fashion across a server and a plurality of clients which are connected together by a network, such as the Internet.

BACKGROUND OF THE INVENTION

Genetic programming and genetic algorithms provide a computational optimisation strategy for problems which are difficult to solve using conventional mathematical techniques. They are particularly applied to highly complex situations, where a very large number of variable parameters prevents any formal attempt at a solution. A typical example of such a problem is where a lorry has to make deliveries to many different sites at various locations, and it is desired to select the shortest route which visits all the necessary sites (this is sometimes referred to as the "travelling salesman" problem, and arises for example in the placement of components and links in a printed circuit board). When the number of sites to be visited is very large, it is not feasible to determine a solution by an exhaustive calculation of the distance for every possible route.

Instead, one way of addressing the problem is to use a genetic algorithm. According to this approach, a set of different possible routes are selected, each being typically represented in practical implementations by a fixed length string, and the distance for each selected route is calculated (this is known as the "fitness"). Then, a new set of routes is generated by forming essentially random combinations of routes from the preceding set, with those routes having the shortest distances (ie best fitness) being preferentially selected for the reproduction of routes into the next generation. The fitness of each member of the new generation is then calculated, and the process is repeated, for example until a predetermined number of generations is reached, or until an individual having a particular fitness level has been produced. Some industrial applications of genetic algorithms are described in "Genetic based Machine Learning—Applications in Industry and Commerce" by Terence C Fogarty, Neil S Ireson, and Lawrence Bull, in the Proceedings of the Conference on Adaptive Computing and Information Processing, in the UK, Jan 25–27, 1994, vol 2, page 509–530, Thus the genetic algorithm mimics natural evolution, in that for each generation, the least successful members are destroyed, and only the most successful members produce progeny for the next generation. In time, it is hoped that the quality of the population steadily improves, eventually leading to an optimal solution. In simplest terms, each cycle of the genetic algorithm involves an evaluation phase for the current population, and then a generation phase, for producing the next population.

Genetic programming is similar to a genetic algorithm, but differs in that in the former, it is essentially the program itself which is changed between generations, rather than some input string, as for the latter. A comprehensive description of genetic programming can be found in "Genetic programming: on the programming of computers by means of natural selection" by John Koza, MIT Press, 1992 (ISBN 0-262-11170-5), and at the WorldWideWeb site: "Genetic Programming FAQ" at (http://www.salford.ac.uk/docs/depts/eee/gp2faq.html).

One of the main disadvantages of genetic algorithms and genetic programming is that they can be very computer-intensive, often requiring extensive computing power. Many people have therefore explored the possibility of using a parallel approach to genetic algorithms. This is particularly appropriate given the inherently parallel nature of many of the operations involved in genetic algorithms (for example in many variations the evaluation phase involves an independent calculation of merit for each member of the population).

Examples of prior art work on distributed or parallel genetic algorithms are: "Multilevel Distributed Genetic Algorithms", by P Osmera, I Simonik, and J Roupec, in Proceedings of the 1st International Conference on Genetic Algorithms in Engineering Systems, 1995, p505–510; "Optimization in a Distributed Processing Environment using Genetic Algorithms with Multivariate Crossover" by A Konstam, S Hartley, and W Carr, Proceedings of CSC 92, ACM 20th Annual Computer Science Conference, Mar. 3–5 1992, p109–116; "A Distributed Parallel Genetic Algorithm for Solving Optimal Growth Models" by P Beaumont and P Bradshaw, in Computational Economics, Vol 8, No 3, August 1995, p159–179; "Minimum Weight Design of Large Structures on a Network of Workstations" by Skumar and H Adeli, in Microcomputers in Civil Engineering, Vol 10, Number 6, November 1995, page 423–432; "A Genetic Approach to Dynamic Load Balancing in a Distributed Computing System" by M Munetomo, Y Takai, and Y Sato, in Proceedings of the 1st IEEE Conference on Evolutionary Computation, Jun. 27–29, 1994, vol 1, p418–421; and "A Summary of Research on Parallel Genetic Algorithms" by E Cantu-Paz, IlliGAL Report No 95007, July 1995, from the Genetic Algorithms Laboratory at the University of Illinois, USA.

Recently, there have been a couple of attempts to use the Internet in genetic programming. For example, "Genetic Programming of Music", by Jeffrey Putnam, New Mexico Institue of Mining and Technology (accessible from http://www.nmt.edu/~jefu/notes/notes.html) describes the use of genetic programming to produce a short segment of music. This method involved posting members of the current population to the WorldWideWeb (WWW) on the Internet, where a large number of people who were visting the site could listen to the segments, and rank them. This would then allow the next population of musical segments to be generated from the most popular members of the current set. Note that in this method, where the evaluation comprised a subjective, human judgement, the Internet simply provided a highly effective means of making the test musical segments available to a large number of listeners/evaluators. Apparently a somewhat similar approach has been taken in an attempt to generate aesthetically pleasing images.

There is also interest in using the Internet for running a simulation of evolution, as described in "A Life in Silicon", by Joe Flower, in the New Scientist, Jun. 15, 1996, p33–36. Essentially, a large number of computer programs have been released onto the Internet, in a project which seeks to mimic the effects of natural selection. The Internet is used because it provides a cheap, and very diverse, environment. Each node incorporated into the environment appears to run a host operating program (referred to as Tierra). Note that this project is simply an attempt to build a computer model of evolution. It does not aim to solve some external problem, and so does not represent genetic programming per se.

Despite the above work, the use of parallel or distributed genetic programming has still proved somewhat too slow for many commercial applications, and so has met with only limited success outside the scientific research community.

SUMMARY OF THE INVENTION

Accordingly, the present invention provides a method of performing distributed genetic programming using a server and a plurality of client machines, the server and the clients being connected via a computer network, said genetic programming aiming to optimise a population of individuals against one or more predetermined fitness criteria, the method including the steps of:

downloading instructions for performing a fitness evaluation on an individual from said server to the client machines;

distributing individuals from said population of individuals from the server across said plurality of client machines; and evaluating the fitness of said distributed individuals at the client machines by using said downloaded instructions.

The invention exploits the inherently parallel nature of genetic programming, to perform a distributed calculation, and also the fact that many client machines are generally under-utilised, and so have some spare computing capacity. The individuals evaluated as having the best fitness are used to produce a new generation of individuals, this being preferably performed at the client (to optimise the distributed nature of the calculation), but otherwise at the server. Assuming the former approach, the new generation of individuals are then returned to the server (possibly after one or more additional evaluation/reproduction cycles). In order to minimise the workload at the server, preferably the first generation of individuals is created at said plurality of client machines.

In the preferred embodiment, each client machine runs a Worldwide Web browser, and said instructions are downloaded over the Internet in the form of a Java applet to be run by said browser on a virtual machine at the client. It will be appreciated that the genetic programming need not necessarily be performed within such a context; for example, an organisation could develop its own customised client-server solution. Nevertheless, the use of a Web browser and the Java virtual machine for downloading and running applets over the Internet is particularly attractive, given that these components already exist. Note that where Java or another object-oriented environment is used, the downloaded individuals are most conveniently represented by objects, and the instructions for performing a fitness evaluation may be partly or wholly incorporated as a method or methods within these objects.

An important feature is that client machines can commence or terminate their participation in the genetic programming at any time. This is likely to occur, since typically the client machines are not under the control of the person coordinating the genetic programming computation (ie the person who owns or has obtained access to the server). This dynamic nature of the client-server system represents a significant distinction over prior art implementations in conventional parallel computing systems. This tolerance of clients joining and leaving is achieved by exploiting the cyclic nature of genetic programming, and having the clients respond to the server typically at the end of every cycle. This ensures that if a client is terminated for whatever reason, then only the individuals for that cycle at the client are lost. In general, the statistical effect of this loss is small. Moreoever, it is possible for the server to track the individuals sent to each client, so that if a client is terminated, then those individuals can simply be re-distributed to another client.

The invention also provides a system for performing distributed genetic programming using a server and a plurality of client machines, the server and the clients being connected via a computer network, said genetic programming aiming to optimise a population of individuals against one or more predetermined fitness criteria, the system including: means for downloading instructions for performing a fitness evaluation on an individual from said server to the client machines;

means for distributing individuals from said population of individuals from the server across said plurality of client machines; and means for evaluating the fitness of said distributed individuals at the client machines by using said downloaded instructions.

The system and method described above can be readily adapted for use in running genetic algorithms, in which case the individuals are generally represented by input strings of fixed length, rather than by configurations of programming operations.

BRIEF DESCRIPTION OF THE DRAWINGS

Preferred embodiments of the invention will now be described in detail by way of example only with reference to the following drawings.

DETAILED DESCRIPTION

Figure 1:
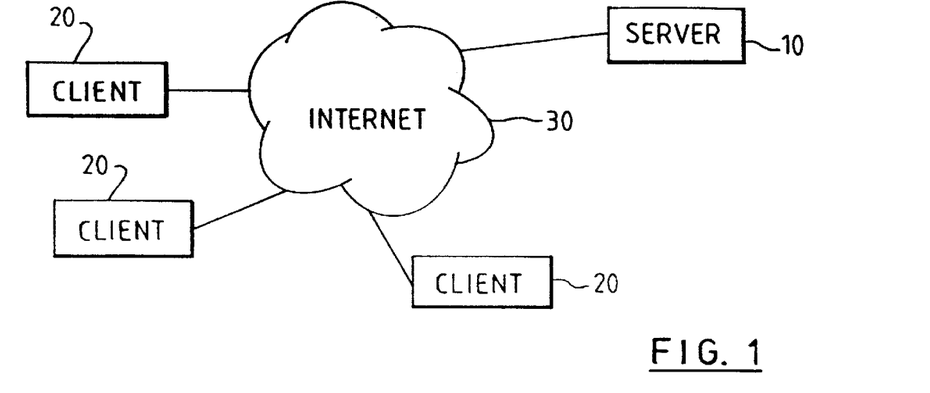
FIG. 1 is a schematic diagram of a server and multiple clients attached to the Internet.

FIG. 1 illustrates in schematic form a server 10 which may be accessed over the Internet Worldwide Web (WWW) 30 by multiple clients 20. The clients and the server generally comprise computer workstations, such as an Aptiva Personal Computer system, or a RISC System/6000 computer, both available from IBM Corporation. Note that typically there will be a wide variety of client machines attached to the Internet. The WWW itself comprises many pages or files of information, distributed across many different servers. Each page is identified by a Universal Resource Locator (URL). The URL denotes both the server machine, and a particular file or page on that machine. Typically there are many pages or URLs resident on a single server.

In order to use the WWW, a client runs a piece of software known as a Web browser, such as WebExplorer (provided as part of the OS/2 operating system from IBM Corporation) or the Navigator program available from Netscape Communications Corporation. The client interacts with the browser to select a particular URL, which in turn causes the browser to send a request for that URL to the server identified in the URL. Typically the server responds to the request by retrieving the requested page, and transmitting the data for the page back to the requesting client. The client server interaction is performed in accordance with the hypertext transport protocol ("http"). This page is then displayed on the client screen. The client may also cause the server to launch an application.

A typical WWW page may include embedded images, or even video or audio segments, and references to one or more other WWW pages. These references are known as hyperlinks, and by selecting one of them the user replaces the currently selected page with the page for the selected hyperlink.

Until recently, the WWW has suffered from the disadvantage that the pages downloaded from the server to a client were essentially passive, in other words, they could not contain code to be executed by the browser at the client machine. However, this difficulty is now being overcome by the use of the Java technology from Sun Microsystems Inc. The Java technology comprises primarily (i) a new programming language, somewhat similar to C and C++, and (II) a virtual machine. Essentially, programs written in the Java programming language can be compiled into byte code form, and then interpreted at runtime on the Java virtual machine. The Java virtual machine converts the byte codes into instructions that can be executed by the underlying physical machine.

Programs written using Java can be downloaded over the WWW in the form of byte codes for execution on a Java virtual machine at the client. Such programs are known as "applets". The use of the Java technology for downloading code over the WWW has two major benefits. Firstly, an applet can be platform independent, if we assume that each client has a copy of the Java virtual machine (the virtual machine at the client's system is typically incorporated either into the operating system, or into the Web browser itself). In other words, there is no need for a server to have different versions of the code for downloading to clients according to their respective operating systems and machines. Therefore only a single version of the relevant code needs to be written and maintained, which saves both time and money for software developers. Secondly, because the applet executes on a virtual machine, rather than a physical machine, security is greatly improved. Thus when downloading code over the network, there is always a risk that it will include some malicious code (accidentally or otherwise) that may damage data or programs stored at the client. The virtual machine however can monitor the operation of the applet, and so detect and prevent such malicious activity.

It will be noted that the concept of downloading software from a server to a client in the form of byte code for execution on a virtual machine is also known independently of the Java technology, see for example U.S. Pat. No. 5,347,632.

In order to invoke a Java applet, a Web page of html text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters which are passed to the applet at runtime. (Note that the APPLET and PARAM tags are not formally incorporated into the html standard, but are nevertheless recognised by many Web browsers). Further information about the Java technology and applets can be found in "Teach Yourself Java in 21 Days" by Laura Lemay and Charles Perkins (Sama.net Publishing, Indianapolis, USA, 1996).

In an exemplary embodiment, genetic programming is used over the Internet with Java to solve the artificial ant problem discussed in the above-mentioned book by Koza (see pages 147–162). In this problem, which is somewhat similar to the travelling salesman problem discussed earlier, an ant exists in a grid world, which has nominal dimensions of 32×32 (although if an ant moves off at one edge, it is re-located at the corresponding position on the opposite edge). A trail of food is located within the grid, with gaps along the route. The ant has three basic operations: move one square forward, turn left and turn right. It is assumed that if an ant moves into a square containing food then it will eat that food. Each basic operation takes unit time, and the objective is to evolve an ant which eats all the food within a limited time period. For a grid having the above dimensions, a time out period of 400 is suitable (if too long a period is allowed, then an ant can eat most or all of the food by simply scanning the grid, rather than trying to follow the trail).

In addition to the three basic operations defined above, the ant also has three complex operations available: IF FOOD AHEAD . . . ELSE, PROG2, and PROG3. The former conditionally detects whether there is any food one step ahead, whilst the latter two complex operations initiate sequences of two or three operations (or groups of operations) respectively. These complex operations are not included in the time count for the ant.

Figure 2A:
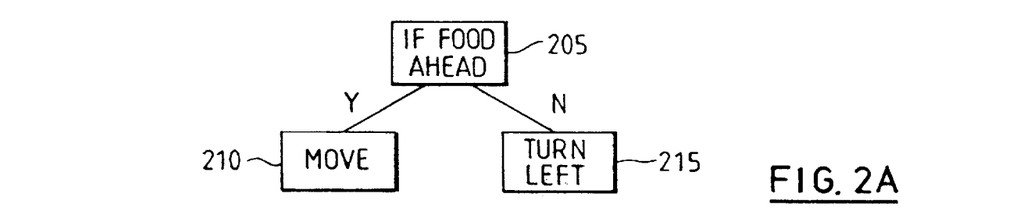
FIGS. 2A and 2B represent sample individuals in a genetic programming system.
Figure 2B:
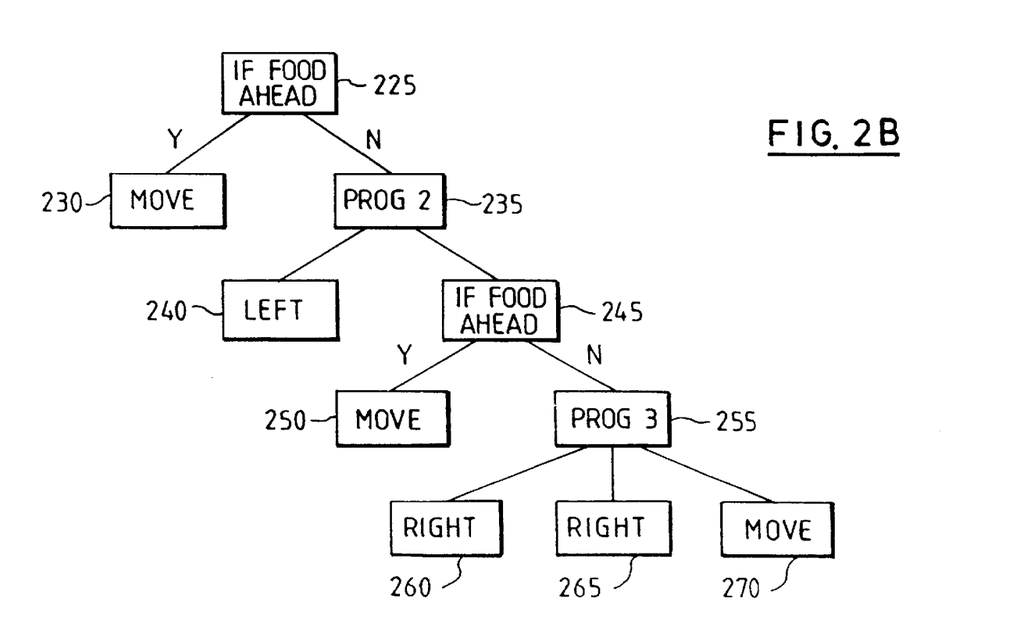

An ant can be represented as a tree of operations, as shown schematically in the examples of FIG. 2. Note that the basic operations (move, left, right) represent the bottom of their respective branch of the tree, and so are known as "terminal" operations, whilst the complex operations, which represent conditions or sequences, have multiple descendant branches, and are known as "functions".

A relatively simple tree is shown in FIG. 2A, where this ant initially detects whether there is any food directly (step 205), and if so moves one step ahead (step 210) to eat this food. However, if there is no food ahead, the ant turns to its left (step 215). Once the ant has performed either the move ahead or the left turn as appropriate, processing of the tree is completed. Processing of the tree then re-starts from the top (root) node of the tree (ie step 205), and this cycle continues until either the ant eats all the available food along the trail, or times out.

The simple ant of FIG. 2A will successfully follow a continuous trail of food, but will get stuck at the first gap, where it will simply spin around and around until it times out.

A more complicated ant is shown in FIG. 2B. As with the ant for FIG. 2A, this first determines whether or not there is food ahead (step 225), and if so moves one step ahead (step 230) to eat the food. However, if there is no food ahead then the ant performs the PROG2 operation (step 235). This requires that the ant perform first the left dependent branch from the PROG2 operation, followed by the right dependent branch. Thus the ant first turns left (step 240) and then tests again whether there is any food (step 245). If so, the ant moves ahead (step 250) to eat the food; otherwise the ant performs the PROG3 operation (step 255), resulting in two successive right turns (steps 260 and 265), followed by a move forward (step 270). As before, once the tree has been fully processed (ie step 230, 240, 250, or 270 has been reached), then processing returns to the top of the tree.

The ant of FIG. 2B effectively moves around a four square grid to search for food if there is no food directly ahead or immediately to the left, and so unlike the ant of FIG. 2A may be able to resume following the trail again despite encountering a gap in the trail. Nevertheless, there are certain gap configurations that will always defeat this ant, and leave it circling in a continuous loop.

Genetic programming seeks to evolve an ant which is highly efficient at following the trail (and hopefully therefore other trails as well; note that this generality is an advantage of genetic programming over the specific solutions provided by genetic algorithms). This is achieved by first generating a random population of say 500 ants, by randomly selecting one of the six possible operations at each available position of the tree (normally the root node is limited to being a complex operation). The depth of the tree is usually limited to a fixed, maximum, value. Once this value is reached, then only terminal operators are considered for that branch. The above-mentioned book by Koza contemplates two approaches for tree growth: in the first, termed "full", each branch of the tree is forced to grow to the specified depth, whilst in the second, termed "grow", each branch is allowed to naturally terminate by a basic operation at a random depth (still limited by the maximum depth).

The fitness of the each ant is then evaluated, by performing the operations constituting the ant (ie repeatedly processing the respective trees such as illustrated in FIG. 2). The fitness of an ant is determined by the amount of food that the ant eats before it is timed out. If an ant manages to eat all of the food on the trail before timing out, then this is regarded as a complete solution, and processing is terminated. However, assuming that no completely successful ant is found, pairs of ants are then selected for mating to produce new ants, with those ants which have the best fitness (ie eaten most food) being preferentially selected to be parents of the next generation.

Figure 3A:
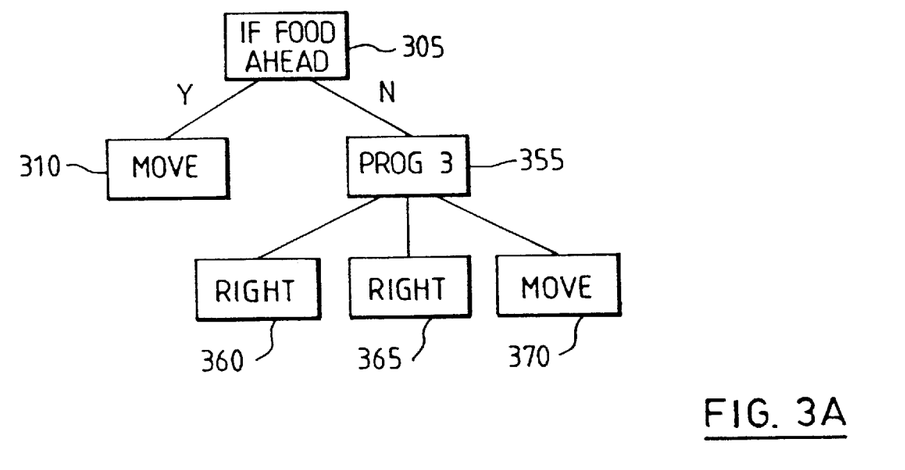
FIGS. 3A and 3B illustrate offspring resulting from the mating of the two individuals in FIG. 2.
Figure 3B:
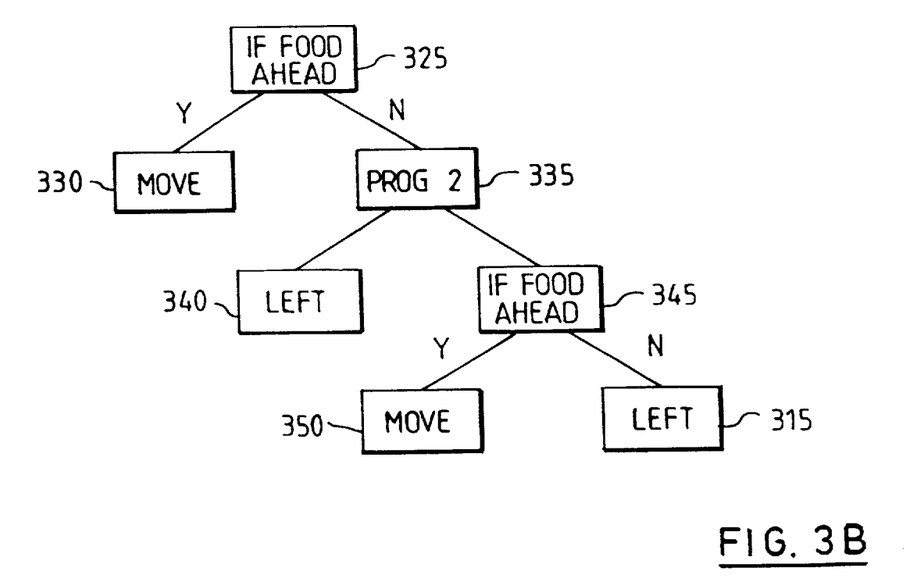

The process of mating is illustrated in FIG. 3, and is accomplished by selecting a random node or operation in each of the two parents, and then swapping the branches that depend from that node. Thus the trees in FIGS. 3A and 3B were generated by mating the trees in FIGS. 2A and 2B, swapping the node 215 in FIG. 2A with the node 255 in FIG. 2B. These are now nodes 355 and 315 in FIG. 3A and FIG. 3B respectively. This mating process is sometimes referred to as crossover. It will be appreciated that each pair of parents has many different possible offspring. Note that after mating corrections may be required to limit the depth, or this may be allowed to grow beyond its initial value.

Once the new generation has been produced, the fitness evaluation of each ant is repeated. The cycle of mating followed by fitness evaluation is then repeated either until an ant is located that eats all the food on the trail (a successful conclusion), or until some other termination criterion is satisfied (eg a predetermined number of generations, say 50, have been produced, or the experiment has run for a fixed length of time).

Genetic programming has often been performed in the language LISP. However, for use on the Internet, it is desirable instead to use the Java programming language, which is an object-oriented language (such as described, for example, in "An Introduction to Object-Oriented Programming" by Timothy Budd, Addison-Wesley, 1991).

The following variables and methods are used to define the ant class in the current implementation:

Variables

Root_node
This locates the object containing the root node of the tree of operations (such as depicted in FIG. 2 or FIG. 3) for this ant.
Depth
This specifies the maximum permitted depth for the tree of an ant. The depth of the tree in FIG. 2A is 2, and in FIG. 2B is 5. This value is defined in the ant class template to a suitable limiting depth, eg 6.
Number_tree
This specifies the number of nodes in the tree. The tree in FIG. 2A has 3 nodes, the tree in FIG. 2B has 10 nodes.
Trail
This locates a copy of the trail object. Note that ant has its own copy of the trail, which is updated to remove any food which the ant has eaten.

Fitness
This details the amount of food so far eaten by the ant. It is initially set to zero in the ant class template (note that instead one could calculate the amount of remaining food).
Remaining_time;
This details the amount of time left for the ant before it times out. It is initially set to an appropriate value, such as 400, in the ant class template.
Facing_direction
This specifies the direction in which the ant is currently facing. It is initially set to an appropriate value, such as EAST, in the ant class template.
XPOS; YPOS
These specify the coordinates of the current position of the ant. They are initially set to an appropriate value, such as 0,0, in the ant class template.
Generation
This indicates the generation number of the ant; thus an initially created ant is first generation, whilst its offspring will be second generation, and so on.

Methods create_ant
This method is used to randomly generate a new ant when the initial ant population is being created.
mate_ant
This method is used to produce a new ant by mating with a specified ant. The tree is altered by the addition of a new branch returned by the mating ant.
give_node
This method is used to access a particular numbered node within the tree, and is used during mating to retrieve a branch from one parent node into the other parent node.
calculate_depth
This method is used to calculate the depth of the tree, and is called during the create_ant and mate_ant methods to ensure that the maximum depth is not exceeded.
renumber_nodes
This method is used to renumber each node within the tree after mating.
move; turn left; turn right
These methods are used to perform the basic moving/turning operations. They update the Fitness, Remaining_Time, XPOS, YPOS and Facing, as appropriate. Note that if consequently Fitness reaches the total amount of food on the trail, or Remaining_Time falls to zero, then an exception is raised, and processing of this ant terminates.
evaluate
This method is used to start the ant on the trail by calling the moving and turning methods as specified in the tree.
same_as
This method detects whether two ants are the same, and so enables duplicates to be detected and deleted (not currently implemented).

The following variables and methods are used to define the trail class in the current implementation:

Variables trail_array
This locates the array containing the trail.

Methods remove_food
This method removes food from the trail array when the ant arrives at the relevant square (ie when the ant eats the food), so that the ant can only eat the food in the array once.
is_food_here
This method detects whether there is any food located on the specified square in the trail, and is called when performing an "if food ahead" evaluation.

The following variables and methods are used to define the tree node class in the current implementation:

Variables

Arity

This defines the number of dependent nodes from this node (thus arity=0 for a basic movement/turning operation, arity=2 for the "if then else" and "prog2" operations, and arity=3 for the "prog3" operation).

Descendants

This is an array of size=arity, which contains pointers to all the objects in the tree which descend from this node.

Parent

This points to the node which is the parent in the tree of the current node.

Number

This holds the identifying number of this node in the tree.

Methods

Evaluate

This performs the operation specified by the node. Thus for the basic operations, it calls the corresponding method in the ant object, whilst for complex operations, it calls the evaluate method in the appropriate descendant object, after performing any necessary testing.

Copy_node

This returns a copy of the node and all nodes that are descendant from it, and is used in mating ants;

Get_node

This is used to locate the node from the tree having a specified number, and is used in mating.

Figure 4:
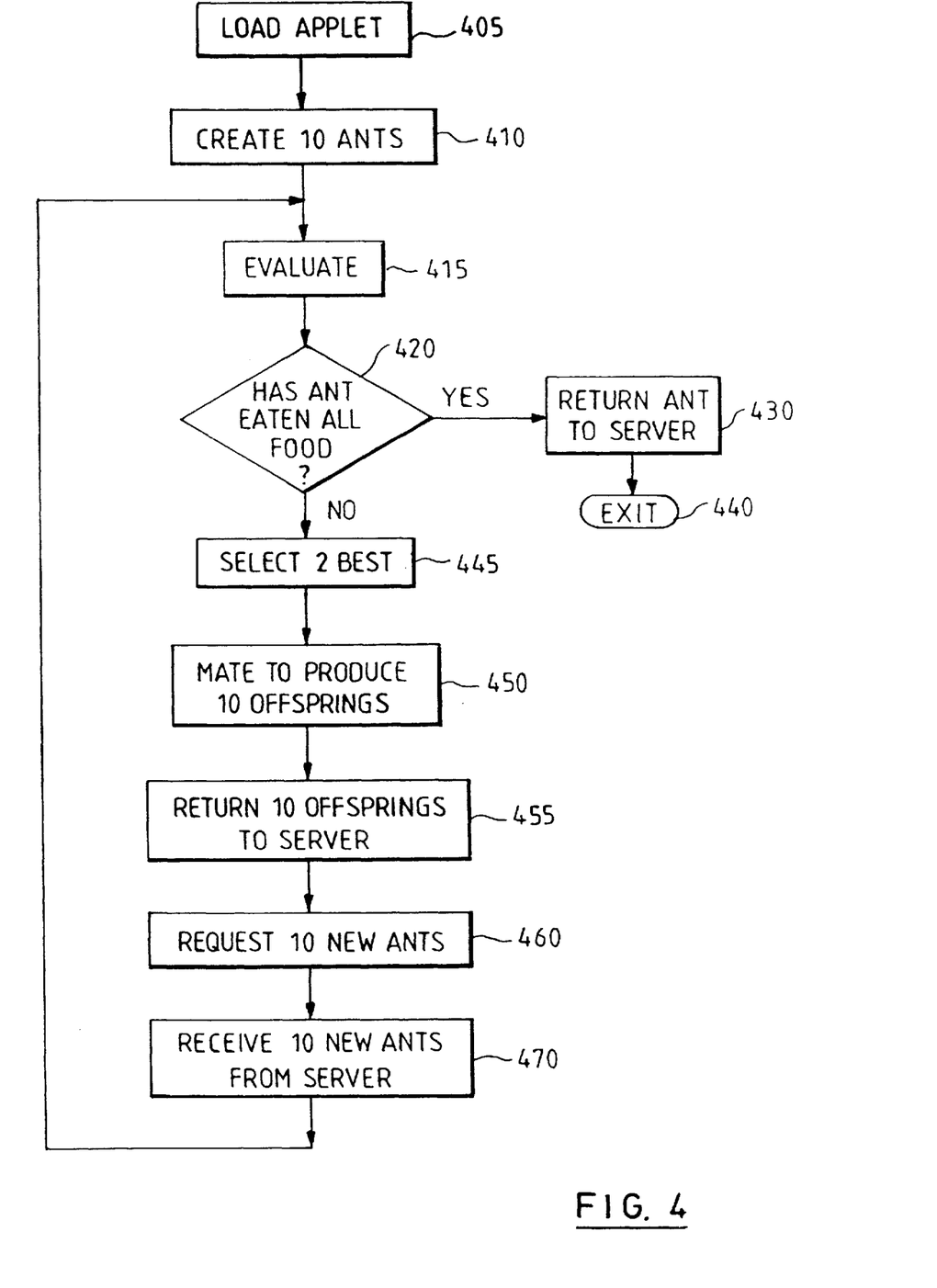
FIG. 4 is a flow chart illustrating processing at a client machine.

FIG. 4 presents a flow chart of the processing at the client to implement genetic programming in the exemplary embodiment utilising the above classes. This commences with the client downloading the Java applet from a specified server (step 405) by setting its browser to the appropriate Worldwide Web page in conventional fashion. The applet includes the class templates for the ant, trail, and tree operations as described above (more precisely, the ant class, the trail class, and the tree operation class are imported from Java package in which they are initially contained). Next, for step 410, during the initialise phase of the applet (see the above-mentioned reference on Java for a description of the different phases of initialisation and execution of a Java applet), the applet creates 10 instances of the ant object using create_ant method. This is done automatically by the Java "new" operator. The tree depth and formation method ("full" or "grow" as described above) is specified for each new ant.

After the initial population of ants has been generated, the main genetic programming loop can be entered. This commences with the evaluation phase (step 415), in which the fitness of each ant in the population on the client is determined by using the evaluate method. If one of the ants manages to consume all the food on the trail, this is handled by raising an exception (step 420), which notifies the server accordingly (step 430), and the applet then exits (step 440). However, assuming that no ant is produced which manages to consume all of the food, the two fittest ants are selected (ie those which have eaten most food). This process of assessing ants locally, rather than against the global population, is known as tournament selection. Ten new ants are then generated from the two selected ants by using the mate_ant method (step 450), and these are returned to a pool in the server (step 455). The client then requests a further set of ten ants from the pool in the server (step 460), which are are duly received from the server (step 470), and evaluated as before (step 415).

Note that although future implementations of Java will allow objects to be moved from one machine to another, this is not possible at present. Thus when transported from the client to server or vice versa (steps 455 and 470), an ant has to be represented as a data set (describing its operation tree, etc), which can then be reconstituted into an ant object at the client or server as appropriate.

As shown in FIG. 4, the processing continues until an ant is found which eats all the food on the trail. However, it will be appreciated that a variety of other halting criteria could be used. For example, processing may terminate after a predetermined amount of time, or after a predetermined number of generations. Another possibility is to stop processing if an impasse appears to have been reached, ie several generations have passed without any improvement in fitness.

The operation of the server in conjunction with the client processing of FIG. 4 is relatively simple, since most of the processing is transferred to the client. Thus the server initially downloads the applet onto each client, in known fashion, where the ants are created, evaluated, and bred, and at some later stage receives back the newly spawned next generation of ants. These received ants are added to a pool, which is implemented as a simple buffer. Then, in response to an incoming request from a client for further ants, 10 ants are randomly selected from the buffer and downloaded onto the client.

The genetic programming system described above offers several significant benefits. It allows genetic programming to be performed in a highly efficient, parallel manner, by exploiting client computing resources which would otherwise generally go idle. One intended environment for example of the present invention is in organisations which currently use supercomputers for computationally intensive problems. The employees of such organisations typically have desktop computers for word-processing and similar functions, which are often heavily under-utilised in terms of their processing power. Assuming that the problem to be solved could be addressed by genetic programming, then each employee could be requested to allow their desktop machine to function as a client in the system described above. Note that the genetic programming applet could be run at low priority to ensure that the other users applications were not adversely affected, or alternatively the applet could be temporarily halted if the user was performing some other function on the computer.

There are many variations on the above approach. For example, rather than have the client continuously performing the genetic programming, the client machines could be automatically triggered to run the genetic progamming at night-time only. Also, the client machines need not belong to the same organisation as the server, but might be donated (either freely or for some form of compensation) by other users on the Internet.

An important aspect of the approach described above is that the relatively informal nature of the interaction between client and server allows clients to effectively come and go with minimum impact. Thus if a client terminates, then this typically leads to the loss of the ants on that machine, but providing that there are still a sufficient number of clients available, then the overall loss is statistically small. One possibility is for the server to store copies of the ants sent to any particular client, and only delete these copies once it is notified that the client has evaluated and bred them to produce a new set of ants (this can be implemented for example by having separate buffers for each client). If no such notification is received, the server can then allocate those ants to another client. Note that optionally the server can also keep track of this duplication, so that if both clients do eventually respond, then one of them can be ignored.

If new clients do not join until several generations have been calculated, then it may be desirable for them to start by evaluating pre-allocated ants from the server (ie corresponding to step 470 in FIG. 4), rather than creating their own new ants. This ensures that multiple generations are produced, even if no single client is involved in the genetic programming for more than one or two generations. Note also that hopefully any newly created individuals introduced late on will have a low fitness compared to those which have progressed through multiple generations, although the newly created individuals may in some cases be useful for maintaining genetic diversity in the population.

The skilled person will be aware of many variations on the above, both in terms of implementation detail, and also relating to the genetic programming framework which is used. For example, in terms of implementation, certain parts of the ant class such as fitness in the preferred embodiment are incorporated into an abstract genetic programming class, where they can easily be re-used for other genetic programming problems. The ant class then represents an extension to the genetic programming class. Also, the client can return the fittest ant from each generation to the client, which can then maintain a record of the fittest ant so far produced.

A complication may arise where one client, or just a few clients, are much faster than the majority of other clients involved in the genetic programming. It is clearly undesirable in this situation for a client to return a set of ants to the server, and then receive the many of the same ants back again for evaluation (this leads to excessive inbreeding). One way of mitigating this problem is for the initial population of ants to be generated by the server rather than by the clients, which would avoid having to wait for multiple clients to return ants in order to establish a suitably large population for further breeding (each client joining in the genetic programming would then start at step 460 in FIG. 4). Alternatively, if a client is very quick to request 10 new ants (step 460) it may instead be asked to create 10 new ants itself (ie to go to step 410), rather than being supplied with 10 new ants from the server. Another simple mechanism to address this problem is to prevent the server from distributing ants unless it has more than a predetermined number of ants in its buffer. This ensures that there is a satisfactory degree of intermixing between the different client populations of ants. It is also possible for the ants to be stored in the buffer along with an indication of the client machine at which they were generated. This allows the new ants for a given client machine to be optionally selected only from those ants which were not generated on that particular client machine.

Nevertheless, it is important that a client should not have to wait for all the other operational clients to return their ants before being allowed to proceed with the next generation, since this would reduce everything to the speed of the slowest client. Note that as a consequence of this, there will not be a uniform generation across clients (or even potentially on one client). However, for the tournament selection utilised in the preferred embodiment, the generation count and any potential interbreeding between generations are relatively insignificant. Thus the genetic programming can easily be continued until a specified date or time, or of course a successful ant, rather than until a predetermined number of generations have been processed.

Among the many possible variations in set-up of the genetic programming problem are:

the possible use of another criterion such as remaining time in addition to food consumed in order to locate the ant which is quickest at consuming the food;

the use of different trails or starting points or directions, rather than starting each ant at the same place with the same trail of food;

rather than producing each new generation by mating the two most successful ants of the preceding generation, parents could be selected with a probability in proportion to their fitness, and good individuals could be directly cloned (ie retained) into the next generation;

new ants could also be asexually reproduced via mutations from a single parent ant;

a predetermined number of evaluation/breeding cycles could be performed on each client before the results are returned to the server;

different population sizes, different basic and complex operations, and different tree depths and formation mechanisms, etc could be employed;

the client could be used for evaluation only, doing all the breeding on the server (this requires more loading on the server, but can lead to more thorough mixing of the population); for example, each client might receive only two ants from the server, compare these with each other, and return the winning ant back to the server for breeding.

It will be appreciated that the above description of possible variations is suggestive rather than exhaustive. It will also be appreciated that whilst the ant problem per se is somewhat artificial, the same approach could be used for example to control a robot following a radioactive leak to track/remove contamination, or to many other genetic programming problems. Many potential variations in the set-up of genetic programming and a wide range of applications are discussed in detail in the above-mentioned Koza reference.

The approach described herein may be extended to genetic algorithms, with the server distributing input strings for evaluation at each client.

Although the preferred embodiment has been described primarily with reference to a client comprising an otherwise conventional computer workstation attached to the Internet, it will be appreciated that the invention is not so limited. For example, the client might be replaced by a so-called network computer, or any other hardware which is capable of receiving and processing code over the Internet. Likewise, the relevant network may not be the Internet, but might be a corporate intranet (which typically uses Internet protocols, such as html, but which is detached from the Internet itself), or any other suitable network. Further, whilst the code to be downloaded in the preferred embodiment comprises Java byte codes, this code might be in any appropriate language, and might be in a form either to be interpreted, for example by a virtual machine, as with Java, or to be directly executed on the hardware or by the operating system of the client machine.

What is claimed is:

1. A method of performing distributed genetic programming using a server and a plurality of client machines, the server and the client machines being connected via a computer network, said genetic programming aiming to optimise a population of individuals against one or more predetermined fitness criteria, each individual being represented by an object including computer code instructions to evaluate fitness of the individual, wherein the computer code instructions may be invoked by calling a method of the object, said method for performing distributed genetic programming including the steps of:

requesting individuals from the server by said client machines;

responsive to said requesting step, distributing individuals from said population of individuals from the server across said plurality of client machines by downloading objects representing the individuals from the server to the corresponding requesting client machines;

evaluating the fitness of each distributed individual at a client machine by calling said method in said object to invoke said computer code instructions; and identifying the individual(s) best satisfying said one or more predetermined fitness criteria, based on results of said evaluating step.

2. The method of claim 1, where each of said plurality of client machines runs a Worldwide Web browser, and said instructions are downloaded in the form of an applet to be run by said browser.

3. The method of claim 2, wherein each of said plurality of client machines has a virtual machine for running said applet.

4. The method of claim 3, where the applet comprises Java byte codes.

5. The method of claim 4, where said computer network is the Internet.

6. The method of claim 1 or 2, further comprising the step of using the individuals evaluated as having the best fitness to produce a new generation of individuals.

7. The method of claim 6, further comprising the step of returning the new generation of individuals to the server.

8. The method of claim 6, further comprising an initial step of creating the first generation of individuals at said plurality of client machines.

9. The method of claim 8, wherein each of said plurality of client machines can commence or terminate their participation in the genetic programming at any time.

10. The method of claim 6, wherein each of said plurality of client machines can commence or terminate their participation in the genetic programming at any time.

11. The method of claims 1 or 2, further comprising an initial step of creating the first generation of individuals at said plurality of client machines.

12. The method of claims 1 or 2, wherein each of said plurality of client machines can commence or terminate their participation in the genetic programming at any time.

13. A system for performing distributed genetic programming using a server and a plurality of client machines, the server and the client machines being connected via a computer network, said genetic programming aiming to optimise a population of individuals against one or more predetermined fitness criteria, each individual being represented by an object including computer code instructions to evaluate the fitness of the individual, wherein the computer code instructions may be invoked by calling a method on the object, the system including:

means in the client machines for requesting individuals from the server;

means in the server responsive to requests from the client machines for distributing individuals from said population of individuals from the server across said plurality of client machines by downloading objects representing the individuals from the server to the corresponding requesting client machines;

means for evaluating the fitness of each distributed individual at a client machine by calling said method in said object to invoke said computer code instructions; and means for identifying the individual(s) best satisfying said one or more predetermined fitness criteria, based on the results of their fitness evaluations.

\* \* \* \* \*